Sept. 11, 1934.  G. H. ACKER  1,972,911
WORM GEAR REDUCTION UNIT
Filed March 14, 1930  2 Sheets-Sheet 1

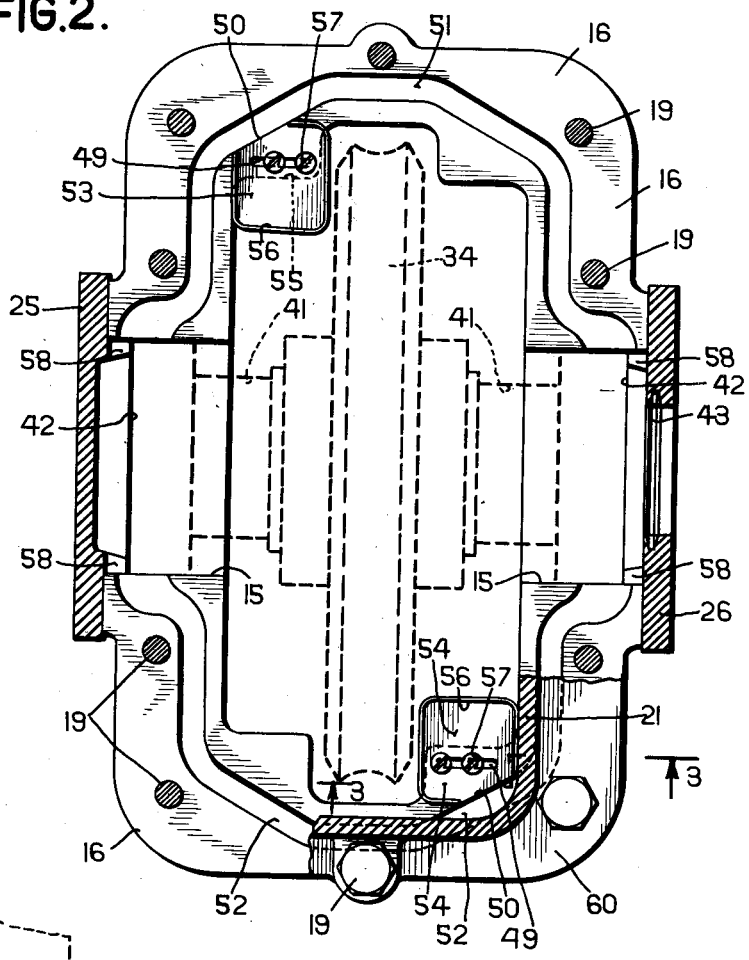

Patented Sept. 11, 1934

1,972,911

UNITED STATES PATENT OFFICE 1,972,911

WORM GEAR REDUCTION UNIT

George H. Acker, Cleveland, Ohio, assignor to Cleveland Worm and Gear Company, Cleveland, Ohio, a corporation of Ohio Application March 14, 1930, Serial No. 435,773

5 Claims. (Cl. 184—11)

This invention relates in general to lubricating arrangements, and more particularly to a lubricating arrangement for a worm gear reduction unit.

According to one form which the invention may take, a worm gear reduction unit may be provided with a catch cup preferably so arranged that the teeth of the worm wheel above the cup shall always slope toward the cup so that the lubricating oil which collects in the roots of the teeth at the top of the gear will be wiped off and caught by the cup as the teeth move downwardly. Suitable provision may be made to carry the oil from the cups to the bearings of the worm wheel shaft, which bearings are preferably of the rolling friction type. If desired two catch cups may be arranged on opposite side faces of the worm wheel and at diametrically opposite positions with respect to the worm wheel.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description, taken in connection with the accompanying drawings forming a part thereof, in which Fig. 1 is a vertical section through a worm gear reduction unit with parts broken away to better illustrate the invention;

Fig. 2 is a section on the line 2—2 of Fig. 1; and

Fig. 3 is a partial section on the line 3—3 of Fig. 2.

Figure 1:
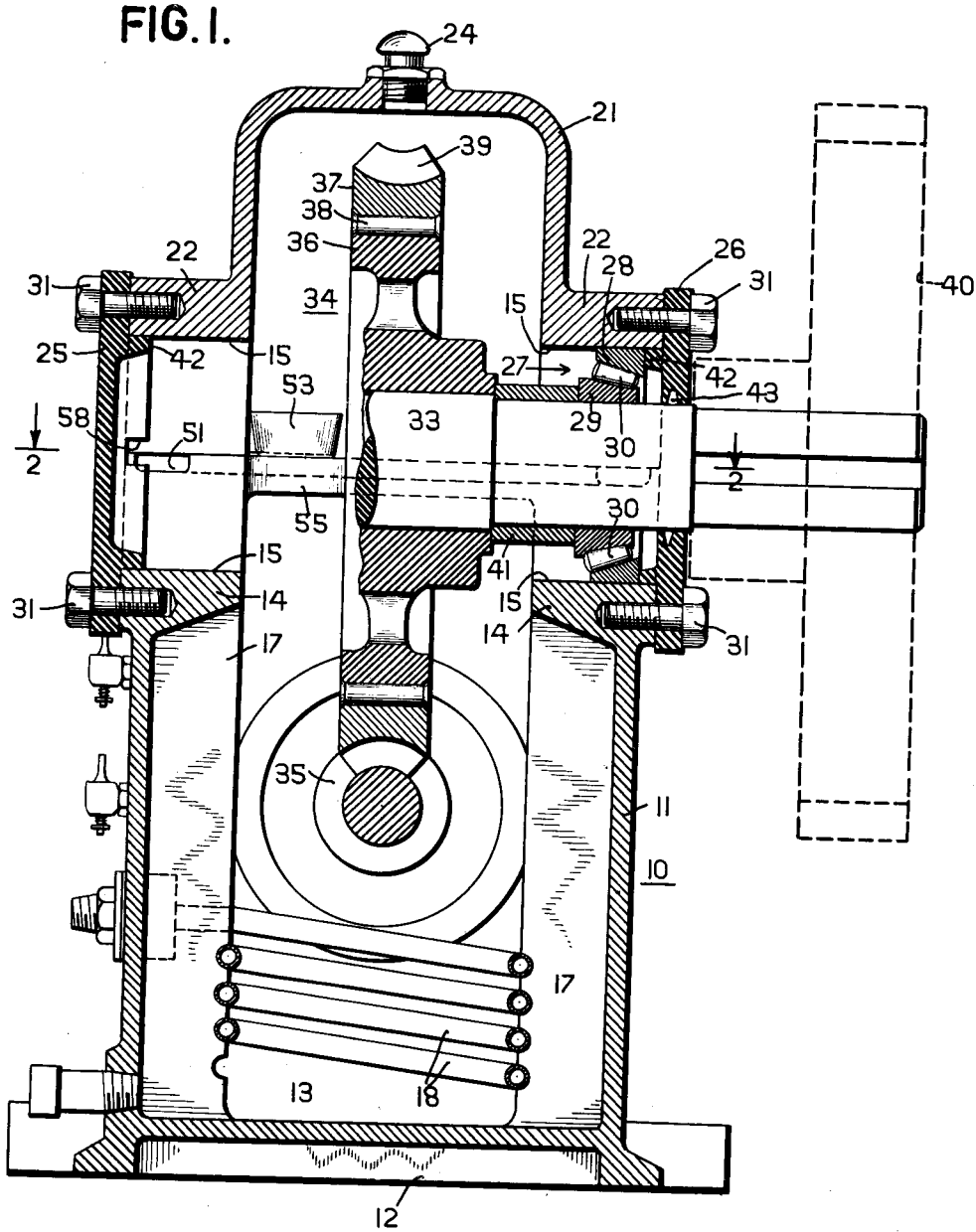

In the following description and in the claims parts will be identified by specific names for convenience, but they are intended to be as generic in their application to similar parts as the art will permit.

Like reference characters denote like parts in the several figures of the drawings.

Referring now to the drawings, the worm gear reduction unit comprises a housing indicated by 10 having a worm indicated by 35 and a worm wheel indicated by 34 suitably journalled therein. The housing 10 is made up of a body 11 and a cap 21 removably secured thereto by bolts 19.

The body 11 comprises a base 12 which supports the side walls of the body. The side walls terminating in bearing flanges 14 provide part of the bearing surfaces 15. The side walls further terminate in flanges 16 through which the fastening bolts 19 pass to secure the cap 21 to the body 11. Suitable strengthening ribs 17 may be provided by which may be supported a cooling coil 18 through which cooling water may circulate. The bottom of the body 11 is filled with lubricating oil (not shown) and forms in effect a reservoir 13 for oiling the several bearings and gear teeth.

The cap 21 is provided with a hole at its top which is closed by a screw plug 24, this hole being for the purpose of filling the unit with oil. The cap 21 is further provided with cylindrical bearing flanges 22 complementary with the flanges 14 and forming the remainder of the bearing surfaces 15. The cap is further provided with a meeting flange 60 cooperating with the flange 16 on the body, and through which the fastening bolts 19 pass to hold the cap and body together.

Disposed within the bearing surface 15 on either side of the worm wheel 34 is a bearing assembly 27 of the rolling friction type. Each assembly 27 comprises an outer race 28 fitting the bearing surface 15, an inner race 29 fitting the shaft 33 and conical rollers 30 between the races.

End plates 25 and 26 are bolted to the housing by bolts 31 to position the bearing assemblies 27, these plates being provided with circular flanges 42 which engage the outer races 28 of the bearing assemblies.

Mounted upon the shaft 33 is the worm wheel 34 made up of a hub member 36 and a ring 37 having teeth 39. Suitable means, forming no part of the present invention and indicated by 38, may be provided for fastening the gear ring 37 and hub 36 together. Suitable spacing sleeves 41 are provided between the gear 34 and the inner races 29. Also mounted on shaft 33 preferably in overhung relation to the unit is a power transmitting device 40 which may be a spur gear.

It will be noted that the plate 26 is provided with an oil groove 43 for preventing escape of oil along the shaft 33 in a manner well known in the art.

For assisting in supplying the bearings 27 with sufficient lubricant, a pair of catch cups 53 and 54 are provided. These catch cups are similar in construction and each comprises a bottom wall with an upstanding side wall 56 which is broken away at 50 to connect with an oil groove cut in the wall of the body 11. The oil groove in one side is denoted by 51 and on the other side by 52, and each oil groove connects its particular catch cup 53 or 54 to both bearings 27. Each catch cup is secured to a ledge 55 by a plurality of screws 57 passing through a slot 49 cut in the bottom of the catch cup. By this arrangement the distance between the catch cup and the worm wheel 34 may be adjusted to the desired clearance, if necessary.

It will be noted particularly from Fig. 3 that each catch cup 53 or 54 is arranged on the side face of the worm wheel 34 to which the teeth 39 incline while they are moving from the bottom of the gear to the top, or vice versa.

It will be seen that the inherent position and shape of the teeth on the worm wheel is used to aid in carrying out the invention. The teeth 39 extend at an angle to the axis of revolution of the gear and incline toward one side face of the gear when moving from a lower to an upper position, and incline to the other side face of the gear when moving from an upper to a lower position. It will be noted that the catch cups 53 and 54 are spaced from the gear 34 so that they cannot touch it. This clearance may be in the order of 30 thousandths of an inch to allow for slight bending of the gear under load. With this clearance, when the oil is cold, it may be thick enough on the side faces of the gear to touch the cups. When the worm gear speed reducer reaches a temperature of between 150° and 180° F., which is a temperature range commonly reached in practice, the oil may be rather well thinned out and the coating of oil on the faces of the worm gear may be less than 30 thousandths of an inch and hence not thick enough to reach the cups.

The oil level in the reservoir 13 is sufficiently high to coat the teeth of the worm wheel 34 well with oil when they mesh the worm 35. In the following explanation of the operation of the invention, the worm wheel 34 is assumed to rotate in such direction that cup 53 is adjacent upwardly moving teeth and cup 54 is adjacent downwardly moving teeth (Figs. 2 and 3). As the teeth 39 travel upwardly, the oil may run to the lower side and drops of oil may fall off the teeth and be caught by the catch cup 53. As the teeth reach their uppermost position, the remaining oil on them collects in the hollows formed by the roots of the gear teeth, and when the teeth move downwardly as indicated by the arrow in Fig. 3, this oil runs off in the direction of the slope of the teeth and is wiped off and caught by the other catch cup 53. If the rotation of the worm wheed be reversed, it will be noted that the cup 53 will wipe and catch oil from the downwardly moving teeth and the cup 54 will catch oil from the upwardly moving teeth. In either direction of rotation of the worm wheel one cup will always be in position to wipe oil from downwardly moving teeth which slope toward the cup.

The oil from the catch cups runs into the grooves 51 and 52 whence it runs into the bearings 27. It will be noted that slots 58 have been cut in the flanges 42 for the purpose of allowing oil to run into the bearing spaces. Otherwise the flanges 42 and the outer races 28 would entirely close up the mouths of the oil grooves 51 and 52. Thus, a lubricating arrangement has been provided which is simple and effective in operation. It does not interfere with the usual splash lubrication action within the housing 10 and is especially useful at low speeds for augmenting the lubrication provided by the splash. The cups 53 and 54 do not contact the gear in any way and yet perform in effect the function of wipers for removing the oil which is collected on the worm wheel.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a worm gear reduction unit, a housing having cylindrical bearing portions on opposite walls of the housing, rolling friction type bearings having their outer races in said bearing portions, a substantially horizontal worm wheel shaft in the inner races of said bearings, said housing having an oil passage extending from one bearing to the other, a catch cup secured to said housing and disposed above and communicating with said passage, said catch cup being spaced from the side face of said worm wheel, but close enough to wipe off oil drops adhering to the lower ends of the sloping teeth on the worm wheel.

2. In a worm gear reduction unit, a housing comprising a body, a cap fitting thereover, said body and cap having meeting faces, said cap and body having complementary cylindrical bearing portions on opposite walls of the housing, rolling friction type bearings having their outer races in said bearing portions, a worm wheel shaft in the inner races of said bearings, plates bolted to said housing to hold said bearings in position, said body having oil grooves in its meeting face one on each side, and each oil groove extending from one bearing to the other, catch cups secured to ledges on said body and communicating with said groove, said cups being adjacent and spaced from opposite side faces of said worm wheel and at diametrically opposite points but close enough to wipe off oil drops from the teeth on the worm wheel, the teeth above said cups sloping toward said cups, said plates having notches to pass oil from said grooves into said bearings.

3. In combination, a gear having teeth sloping at an angle to the axis of the gear, means for journalling said gear to rotate about a substantially horizontal axis, a catch receptacle located between the top and bottom of the gear and at a side face adjacent the lower ends of the sloping teeth, said receptacle being spaced from said side face but close enough to wipe off and catch drops of lubricant which adhere to the lower ends of those sloping teeth traveling downwardly, said drops being due to the lubricant collecting in the roots of the teeth at the top of the gear and following the slope of the teeth as they move downwardly from the top.

4. In combination, a worm wheel having teeth sloping at an angle to the axis of the gear, means for journalling said gear to rotate about a substantially horizontal axis, a catch receptacle located between the top and bottom of the worm wheel and at a side face adjacent the lower ends of the sloping teeth, said receptacle being spaced from said side face but close enough to wipe off and catch drops of lubricant which adhere to the lower ends of those sloping teeth traveling downwardly, said drops being due to the lubricant collecting in the hollows formed by the roots of the teeth at the top of the worm wheel and following the slope of the teeth as they move downwardly from the top.

5. In combination, a worm wheel having teeth sloping at an angle to the axis of the gear, means for journalling said gear to rotate about a substantially horizontal axis, a catch receptacle located between the top and bottom of the worm wheel and at a side face adjacent the lower ends of the sloping teeth, said receptacle being spaced from said side face but close enough to wipe off and catch drops of lubricant which adhere to the lower ends of those sloping teeth traveling downwardly, said drops being due to the lubricant collecting in the hollows formed by the roots of the teeth at the top of the worm wheel and following the slope of the teeth as they move downwardly from the top, and a second catch cup located at the opposite side face of the worm wheel and at the opposite peripheral face of the worm wheel to catch lubricant which may drop off of the upwardly moving teeth of the worm wheel, the action of the catch cups being reversed when the rotation of the worm wheel is reversed.

GEORGE H. ACKER.